United States Patent [19]

Manno

[11] Patent Number: 5,596,832
[45] Date of Patent: Jan. 28, 1997

[54] KNOTLESS LINE SPLICERS

[76] Inventor: Joseph T. Manno, Star Route, Box 24, Kane, Pa. 16735

[21] Appl. No.: 430,840

[22] Filed: Apr. 28, 1995

[51] Int. Cl.$^6$ ............................................. A01K 91/00
[52] U.S. Cl. ................................. 43/44.83; 43/44.98
[58] Field of Search ............................ 43/44.83, 44.98; 289/17

[56] References Cited

U.S. PATENT DOCUMENTS

| 279,206 | 6/1883 | Van Altena . | |
|---|---|---|---|
| 372,686 | 11/1887 | Lester | 43/44.83 |
| 454,581 | 6/1891 | Mack . | |
| 469,015 | 2/1892 | Hemenway . | |
| 724,362 | 3/1903 | Wilson | 43/44.83 |
| 1,002,981 | 9/1911 | Ford | 43/44.98 |
| 1,158,957 | 11/1915 | Bates | 43/44.98 |
| 1,227,325 | 5/1917 | Schilling . | |
| 1,779,343 | 10/1930 | Sylvanne | 43/44.83 |
| 2,222,277 | 11/1940 | Baker | 43/44.83 |
| 2,518,634 | 8/1950 | Peterson . | |
| 2,532,045 | 11/1950 | Walsh . | |
| 2,616,208 | 11/1952 | Stogermayer | 43/44.83 |
| 2,621,438 | 12/1952 | Helin . | |
| 2,750,704 | 6/1956 | Bemis . | |
| 2,754,615 | 7/1956 | Toil | 43/44.83 |
| 2,796,695 | 6/1957 | Meulnart . | |
| 2,870,563 | 1/1959 | Rose . | |
| 2,926,454 | 3/1960 | Gottman . | |
| 2,984,882 | 5/1961 | Winn . | |
| 2,984,930 | 5/1961 | Fadely . | |
| 3,002,310 | 10/1961 | Ferguson . | |
| 3,453,769 | 7/1969 | Chandler . | |
| 3,778,921 | 12/1973 | Peterson . | |
| 3,785,011 | 1/1974 | Marks | 43/44.83 |
| 3,798,824 | 3/1974 | Nikota . | |
| 3,936,971 | 2/1976 | McGahee . | |
| 4,107,866 | 8/1978 | Manno . | |
| 4,209,933 | 7/1980 | Manno . | |
| 4,232,470 | 11/1980 | Steffick, Jr. . | |
| 4,294,031 | 10/1981 | Manno . | |
| 4,819,366 | 4/1989 | Manno . | |
| 4,905,403 | 3/1990 | Manno . | |
| 5,009,025 | 4/1991 | Austad | 43/44.83 |
| 5,265,370 | 11/1993 | Wold . | |
| 5,373,658 | 12/1994 | Huppert . | |

FOREIGN PATENT DOCUMENTS

| 1123195 | 5/1982 | Canada . | |
|---|---|---|---|
| 23462 | of 1908 | United Kingdom . | |
| 2030032 | 4/1980 | United Kingdom | 43/44.83 |

Primary Examiner—Kurt Rowan
Attorney, Agent, or Firm—Nixon & Vanderhye P.C.

[57] ABSTRACT

A combination line splicer and line connection wherein the splicer includes a relatively straight and relatively rigid shank, formed with a pair of open eyes, one at each of two opposite ends thereof. A pair of lines are securely fastened to the splicer by a knotless arrangement wherein the lines are wrapped about the shank in one direction and pulled into respective ones of the pair of open eyes. A method of securing a pair of lines extending in generally opposite directions to a splicer, wherein the splicer includes a shank and open loops on the shank for securing the pair of lines to the splicer in a knotless manner, opposite ends of the shank, includes the steps of:

a) orienting ends of the lines in generally overlapped relationship;

b) wrapping the overlapped ends about a first portion of the shank, pulling one line into one of the open eyes;

c) turning the splicer end-over-end and wrapping the overlapped ends about a second portion of the shank and pulling the other line into the other of the open eyes.

9 Claims, 3 Drawing Sheets

FIG. 1
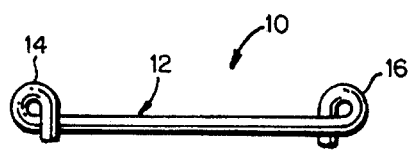
FIG. 1A
FIG. 1B
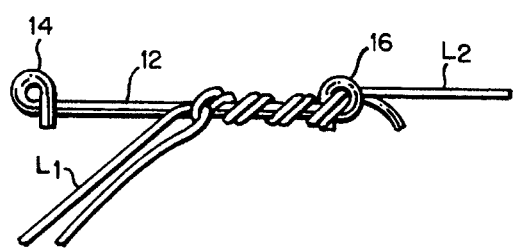
FIG. 1C
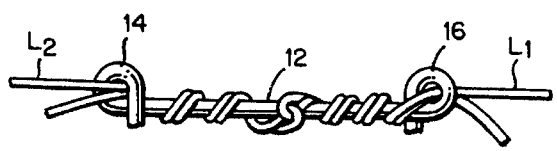
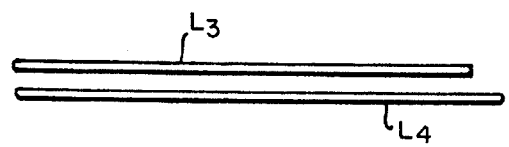
FIG. 1D
FIG. 1E
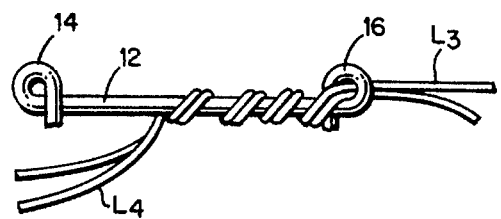
FIG. 1F

5,596,832

KNOTLESS LINE SPLICERS

This invention relates to one-piece splice members particularly adapted for connecting flexible lines such as fishing lines.

BACKGROUND

Line connectors or splicers in the fishing equipment field are not new. Representative examples of connector devices may be found in U.S. Pat. Nos. 2,984,882 and 3,936,971. There remains a need, however, for a sturdy line splicer which is strong and easy to use, particularly in the sense that it does not require the tying of knots to secure the lines to the splicer.

SUMMARY OF THE INVENTION

In accordance with the variously disclosed embodiments in this invention, line splicers are disclosed which incorporate knotless line securement features similar to those disclosed in my prior U.S. Pat. Nos. 4,107,866; 4,209,933; 4,294,031; 4,819,366; and 4,905,403.

In accordance with a first exemplary embodiment of the invention, a line splicer is provided which includes a relatively straight, rigid wire which terminates at opposite ends in open loops or eyes. Lines extending in opposite directions may be secured to the splicer quickly and easily, without tying any knots. For example, the two lines may be looped together, wrapped several times around the straight shank portion and then pulled into the open eye at one end of the shank, turned end for end, and then wrapped about the shank towards the other eye and then pulled into the latter, as described in further detail hereinbelow.

Lines may be secured to the above described splicer, however, without having to first loop the lines together as described above. Thus, the lines may simply be overlapped in a substantially parallel orientation and then wrapped about the shank and pulled into the open eyes at opposite ends of the splicer, substantially described above.

In a second exemplary embodiment, the splicer incorporates a T-bend intermediate the open loops or eyes at the opposite ends of the splicer. One line may be looped over the T-bend, wrapped around one portion of the shank and pulled through an open eye at the end of the shank. The same procedure is then followed with the other line to complete the spliced connection.

In a third exemplary embodiment of the invention, an open eye or loop is located in the straight shank portion, intermediate the opposite ends which incorporate two smaller open loops or eyes. Here again, one line loop may be pulled into the larger open eye in the middle of the splicer, wrapped about the shank and then pulled into one of the open eyes at one end of the splicer. A similar procedure may be followed for the other of the two lines.

While the above described splicer elements are particularly advantageous in the context of securing fishing lines, the splicers may be scaled upwardly to a larger size to handle stronger and larger diameter lines or strands including steel cable, chains, etc. In the latter case, clamps are not necessary to hold the cables together. The friction of the cable wrapped about the shank of the splicer, bearing on one another, works very well and transfers much of the load to the cables themselves through friction, and without kinking the cable material. It will be appreciated that the open eyes and T-bends are sized as necessary to accommodate the strand diameter.

On the whole, the splicer elements in accordance with this invention provide a means for joining similar and dissimilar strands together without tying a knot and without damaging the materials, while at the same time, maximizing line strength. In the fishing application, for example, the splice strength is at least as great as the tensile strength of the line.

Therefore, in accordance with its broader aspects, the present invention relates to a combination line splicer and line connection wherein the splicer consists of a relatively straight and relatively rigid shank, formed with a pair of open eyes, one at each of two opposite ends thereof; and a pair of lines securely fastened to the splicer by a knotless arrangement wherein the respective lines are wrapped about the shank and pulled into respective ones of the pair of open eyes, and wherein the open eyes have free ends which lie, respectively, on opposite sides of the shank.

In another aspect, the invention relates to a method of securing a pair of lines extending in generally opposite directions to a splicer, wherein the splicer includes a shank and open loops on the shank for securing the pair of lines to the splicer in a knotless manner, opposite ends of the shank, the method comprising the steps of:

a) orienting ends of the lines in generally overlapped relationship;

b) wrapping the overlapped ends about a first portion of the shank, pulling one line into one of the open eyes;

c) turning the splicer end-over-end and wrapping the overlapped ends about a second portion of the shank and pulling the other line into the other of the open eyes.

In still another aspect, the invention relates to a method of securing a pair of lines extending in generally opposite directions to a splicer, when the splicer includes a shank portion, a pair of open eyes at respective opposite ends of the shank, and a line attachment structure formed in the shank intermediate the pair of open eyes, comprising the steps of:

a) looping a first line about the line attachment structure;

b) wrapping the first line about the shank portion towards one of the pair of open eyes and pulling the first line into the one open eye;

c) looping a second line about the line attachment structure; and d) wrapping the second line about the shank portion towards the other of the pair of open eyes and pulling the second line into the other of the open eyes.

Additional objects and advantages will become apparent from the detailed description which follows.

BRIEF DESCRIPTION OF THE DRAWINGS

FIG. 1 is a side elevation of a line splicer in accordance with a first exemplary embodiment of the invention;

FIG. 1A is a partial side elevation of two lengths of fishing line looped together in a manner which facilitates securement to the line splicer shown in FIG. 1;

FIG. 1B illustrates a first step in a method of securing one of the looped lines shown in FIG. 1A about one end of the line splicer shown in FIG. 1;

FIG. 1C illustrates a second step where the other looped line is secured about the opposite end of the splicer shown in FIG. 1;

FIG. 1D is a partial side elevation of two lengths of fishing line arranged in a parallel overlapped arrangement which facilitates securement to the line splicer shown in FIG. 1;

FIG. 1E illustrates a first step in a method of securing one of the looped lines shown in FIG. 1D about one end of the line splicer shown in FIG. 1;

FIG. 1F illustrates a second step where the other overlapped line is secured about the opposite end of the splicer shown in FIG. 1;

DETAILED DESCRIPTION OF THE DRAWINGS

Figure 2:
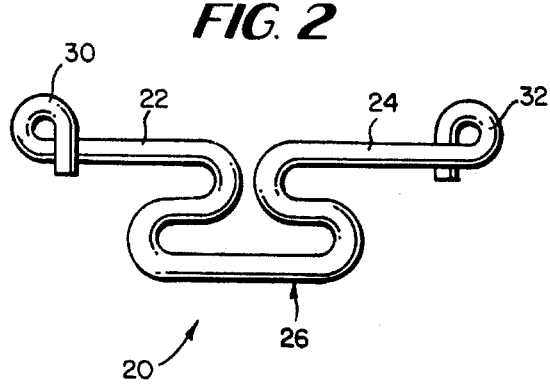
FIG. 2 is a side elevation of a splicer element in accordance with a second exemplary embodiment of the invention.

With reference now to FIG. 1, a splicer element 10 in accordance with this invention includes a relatively straight and relatively rigid wire shank 12 which is formed with open loops or eyes 14, 16 at opposite ends thereof. The eyes or loops 14, 16 are "open" in the sense that they are not welded or otherwise fixed to the shank portion 12, but rather simply abut the shank such that a line may be pulled into the open eye with some force applied. Note that the tree ends of the open eyes or loops 14, 16 lie on opposite sides of the shank 12.

Turning to FIG. 1A, a pair of lines L1 and L2 are shown in looped relationship which facilitates connection of the lines L1 and L2 to the splicer 10 shown in FIG. 1. Specifically, and with reference to FIG. 1B, the user holding the lines together in the looped manner shown in FIG. 1A, i.e., with double strands extending in opposite directions, then simply wraps one loop about the shank 12 and pulls the double strands into the open eye 16 such that line L1 extends away from the splicer in one direction. The splicer is then turned end-over-end and the double strands of the second loop is wrapped about the shank 12 in the same rotational direction and pulled into the second open loop or eye 14.

It will be appreciated that the lines L1 and L2 need not be looped in the manner shown in FIG. 1A in order to obtain a secure attachment to the line splicer. Rather, the lines may simply overlap in substantially parallel, linear orientation as shown by lines L3 and L4 in FIG. 1D. The overlapped line may then be wrapped about one end of the shank 12 with the overlapped line pulled into one open eye 16 as best seen in FIG. 1A. After turning the splicer end-over-end, the other overlapped line is wrapped about the second end of the shank 12 and this second overlapped line pulled into the open eye 14 as best seen in FIG. 1F.

Figure 2A:
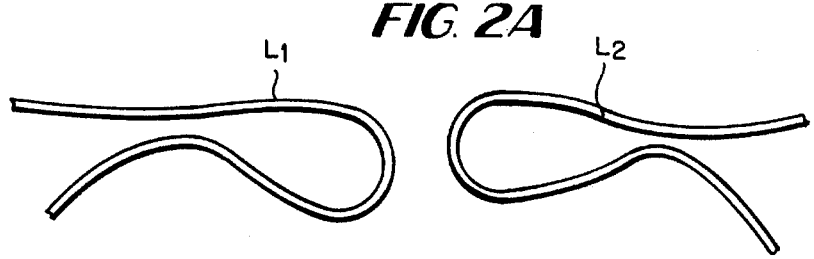
FIG. 2A illustrates a pair of line loops arranged to facilitate connection with a line splicer as illustrated in FIG. 2.
Figure 2B:
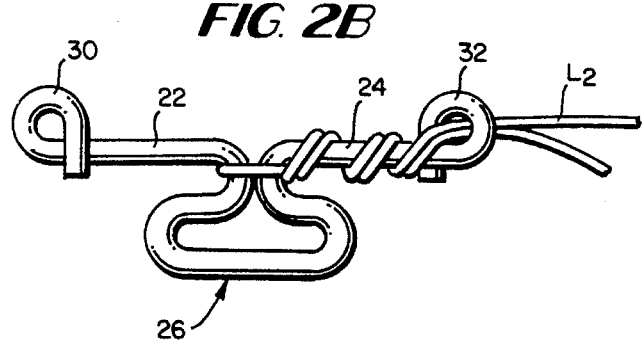
FIG. 2B illustrates a first step in a method of securing one of the lines shown in FIG. 2A about one end of the line splicer illustrated in FIG. 2.
Figure 2C:
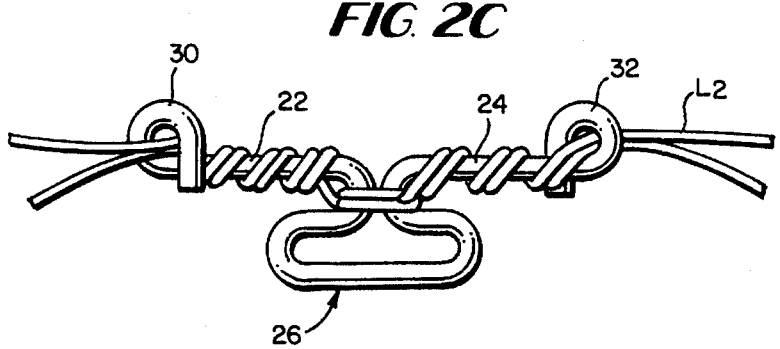
FIG. 2C illustrates a second step where the other looped line is secured about the opposite end of the splicer element shown in FIG. 2.

Turning now to FIG. 2, a line splicer 20 in accordance with a second exemplary embodiment of the invention includes straight shank portions 22 and 24 separated by a T-bend 26. The tree ends of the shank portions 22 and 24 are bent to form open loops or eyes 30 and 32, respectively, at opposite ends of the splicer shank portions 22 and 24. With reference to FIG. 2A, lines L1 and L2 are shown in the proximate orientation for attachment to the line splicer 20. With reference to FIG. 2B, the lines L1 and L2 may be looped over the T-bend in opposite directions with one of the lines L1 and a doubled back strand of line L1 wrapped several times about shank portion 22 and then pulled through the open eye 30. After turning the splicer 20 end-over-end, the other of the lines L2 and a doubled back strand of line L2 are wrapped about the other end of the shank and wrapped about shank portion 24 and then pulled through open eye 32 as shown in FIG. 2C.

Figure 3:
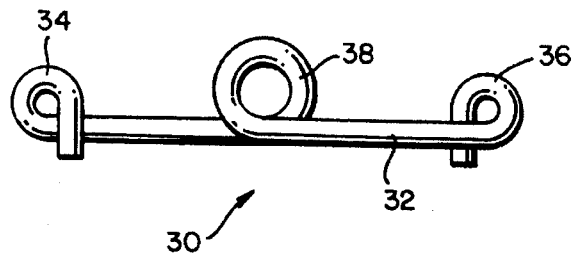
FIG. 3 is a side elevation of a line splicer in accordance with a third exemplary embodiment of the invention.
Figure 3A:
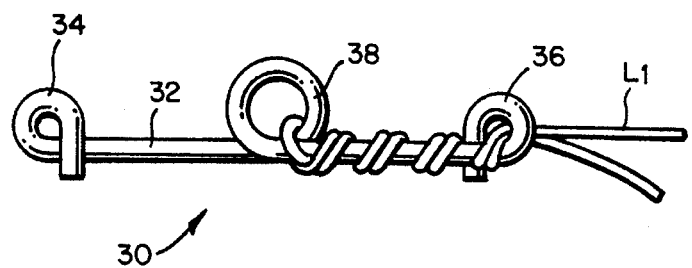
FIG. 3A illustrates a first step in method of securing one of a pair of line loops about one end of the splicer shown in FIG. 3.
Figure 3B:
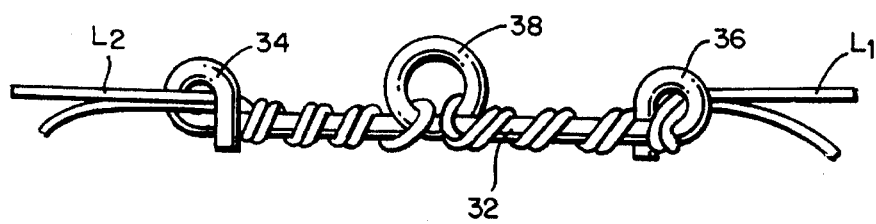
FIG. 3B illustrates a second step where the other looped line is secured about both ends of the line splicer shown in FIG. 3.

Turning now to FIG. 3, a third line splicer 30 in accordance with this invention includes a shank portion 32 having open eyes or loops 34 and 36 at opposite ends thereof, but also formed with a larger open loop or eye 38 intermediate the open eyes 34 and 36. FIG. 3A illustrates the manner in which one of a pair of looped lines L1 (similar to the orientation shown in FIG. 2A) can be pulled into the open eye 38 then, along with a doubled back strand of line L1 wrapped about a shank portion 32 and pulled into the open eye 36. After turning the splicer 30 end-over-end, the other looped line L2 is then pulled into the open eye 38, and along with a doubled back strand of line L2, wrapped about the shank 32 on the other side of the eye 38, and then pulled into the eye 34 as shown in FIG. 3B.

It should be appreciated that the splicer devices of this invention are effective with any conventional fishing line including monofilament, braided, and even Kevlar™. It should also be emphasized that it has been determined that the splicers in accordance with this invention have strengths equal at least to the tensile strength of the various lines.

While the above examples are directed toward the fishing field, the splicers described herein have applicability in virtually any situation where strands of material, including wires, cables, chains and the like require axial connection via splices. In all cases, knots are not required to achieve a strong splice.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combination line splicer and line connection wherein the splicer consists of a relatively straight and relatively rigid shank, formed with a pair of open eyes, one at each of two opposite ends thereof; and a pair of lines securely fastened to the splicer by a knotless arrangement wherein end portions of the lines are looped about each other, wrapped about the shank in opposite linear directions towards said opposite ends and pulled into respective ones of said pair of open eyes, and wherein said open eyes have free ends which like, respectively, on opposite sides of said shank.

2. A method of securing a pair of lines extending in generally opposite directions to a splicer, wherein the splicer includes a shank and open loops on opposite ends of said shank, for securing said pair of lines to said splicer in a knotless manner, the method comprising the steps of:

a) orienting ends of the lines in generally overlapped relationship;

b) wrapping the overlapped ends about a first portion of the shank, and pulling one line into one of the open eyes;

c) turning the splicer end-over-end and wrapping the overlapped ends about a second portion of the shank and pulling the other line into the other of the open eyes.

3. The method of claim 2 wherein the open loops have free ends which engage, respectively, opposite sides of the shank.

4. The method of claim 2 wherein, during step a), the lines are looped about each other.

5. The method of claim 2 wherein, during step a), the lines are overlapped in substantially parallel relationship.

6. A method of securing a pair of lines extending in generally opposite directions to a splicer, wherein the splicer includes a shank portion, a pair of open eyes at respective opposite ends of the shank, and a line attachment formed in the shank intermediate the pair of open eyes, comprising the steps of:

a) looping a first line about the line attachment structure such that the first line and a doubled back strand of the first line lie to one side of said line attachment structure;

b) wrapping the first line and its doubled back strand about the shank portion towards one of the pair of open eyes and pulling the first line and its doubled back strand into the one open eye;

c) looping a second line about the line attachment structure such that the second line and a doubled back strand of the second line lie to an opposite side of said line attachment structure; and d) wrapping the second line and its doubled back strand about the shank portion towards the other of the a pair of open eyes and pulling the second line and its doubled back strand into the other of the open eyes.

7. A combination line splicer and line connection wherein the splicer consists of a relatively straight and relatively rigid shank, formed with a pair of open eyes, one at each of two opposite ends thereof; and a pair of lines securely fastened to the splicer by a knotless arrangement wherein end portions of the lines are linearly overlapped and then wrapped together about the shank in opposite linear directions towards said opposite ends, and then pulled into respective ones of said pair of open eyes, and wherein said open eyes have free ends which lie, respectively, on opposite sides of said shank.

8. A combination line splicer and line connection wherein the splicer consists of a relatively straight and relatively rigid shank, formed with a pair of open eyes, one at each of two opposite ends thereof; and a hollow T bend intermediate the open eyes; and a pair of lines securely fastened to the splicer by a knotless arrangement wherein end portions of each line are looped about the hollow T bend and then each line and a doubled back strand thereof are wrapped about the shank in opposite linear directions towards said opposite ends and pulled into respective ones of said pair of open eyes.

9. A combination line splicer and line connection wherein the splicer consists of a relatively straight and relatively rigid shank, formed with a pair of open eyes, one at each of two opposite ends thereof; and a third open eye intermediate the open eyes; and a pair of lines securely fastened to the splicer by a knotless arrangement wherein end portions of each line are looped about the third open eye and then each line and a doubled back strand thereof are wrapped about the shank in opposite linear directions towards said opposite ends and pulled into respective ones of said pair of open eyes.

* * * * *